US012770766B2

(12) United States Patent
Arai

(10) Patent No.: US 12,770,766 B2
(45) Date of Patent: Oct. 20, 2026

(54) MAGNETIC BEADS, MAGNETIC BEADS DISPERSION LIQUID, METHOD OF MANUFACTURING MAGNETIC BEADS, AND METHOD OF MANUFACTURING MAGNETIC BEADS DISPERSION LIQUID

(71) Applicant: SEIKO EPSON CORPORATION, Tokyo (JP)

(72) Inventor: Akira Arai, Shimosuwa (JP)

(73) Assignee: SEIKO EPSON CORPORATION (JP)

( * ) Notice: Subject to any disclaimer, the term of this patent is extended or adjusted under 35 U.S.C. 154(b) by 847 days.

(21) Appl. No.: 18/109,300

(22) Filed: Feb. 14, 2023

(65) Prior Publication Data

US 2023/0260683 A1 Aug. 17, 2023

(30) Foreign Application Priority Data

Feb. 15, 2022 (JP) ................................ 2022-021070

(51) Int. Cl.

| | |
|---|---|
| ***H01F 1/33*** | (2006.01) |
| ***B22F 1/05*** | (2022.01) |
| ***B22F 1/08*** | (2022.01) |
| ***B22F 1/107*** | (2022.01) |
| ***B22F 1/16*** | (2022.01) |
| ***B22F 9/08*** | (2006.01) |
| ***C22C 38/00*** | (2006.01) |
| ***H01F 1/09*** | (2006.01) |

(52) U.S. Cl.

CPC .................. *H01F 1/33* (2013.01); *B22F 1/05* (2022.01); *B22F 1/107* (2022.01); *B22F 1/16* (2022.01); *B22F 9/082* (2013.01); *H01F 1/09* (2013.01); *B22F 1/08* (2022.01); *B22F 2301/25* (2013.01); *B22F 2301/35* (2013.01); *B22F 2302/256* (2013.01); *B22F 2998/10* (2013.01); *B22F 2999/00* (2013.01); *C22C 38/00* (2013.01); *C22C 2202/02* (2013.01)

(58) Field of Classification Search

CPC ......... H10F 1/09; H10F 1/33; C22C 2202/02; C22C 38/00; B22F 1/16; B22F 1/05; B22F 1/107; B22F 9/082; B22F 9/00; B22F 2301/35; B22F 2301/25; B22F 2301/256; B22F 2998/00; B22F 2998/10

See application file for complete search history.

(56) References Cited

U.S. PATENT DOCUMENTS

2017/0283791 A1* 10/2017 Fukushima ............... B03C 1/01
2021/0060642 A1* 3/2021 Tanoue ............... C22C 33/0228
2022/0392676 A1* 12/2022 Fujita ........................ B22F 1/16

FOREIGN PATENT DOCUMENTS

| | | | | |
|---|---|---|---|---|
| JP | 2014-120678 | * | 6/2014 | |
| JP | 2014-120678 A | | 6/2014 | |
| JP | 2017-176023 A | | 10/2017 | |
| JP | 2021-34460 | * | 3/2021 | |
| WO | WO-2021106752 A1 | * | 6/2021 | C22C 33/0278 |

* cited by examiner

*Primary Examiner* — C Melissa Koslow

(74) *Attorney, Agent, or Firm* — Harness, Dickey & Pierce, P.L.C.

(57) ABSTRACT

Magnetic beads include: a magnetic metal powder; and a coating layer covering a surface of the magnetic metal powder. t/D50, which is a ratio of a thickness t of the coating layer to the magnetic beads diameter D50, is from 0.0001 to 0.05, and a Vickers hardness of the magnetic metal powder is 100 or more.

7 Claims, 2 Drawing Sheets

MAGNETIC BEADS, MAGNETIC BEADS DISPERSION LIQUID, METHOD OF MANUFACTURING MAGNETIC BEADS, AND METHOD OF MANUFACTURING MAGNETIC BEADS DISPERSION LIQUID

The present application is based on, and claims priority from JP Application Serial Number 2022-021070, filed Feb. 15, 2022, the disclosure of which is hereby incorporated by reference herein in its entirety.

BACKGROUND

1. Technical Field

The present disclosure relates to magnetic beads, magnetic beads dispersion liquid, a method of manufacturing magnetic beads, and a method of manufacturing magnetic beads dispersion liquid.

2. Related Art

In recent years, in fields of diagnosis and life science in a medical field, there has been an increasing demand for testing so-called biological substances such as nucleic acids, proteins, cells, bacteria, and viruses. In the process of testing such a biological substance, it is necessary to first extract a test target substance from a specimen. In the process of extracting the biological substance, a magnetic separation method using magnetic beads is widely used. The magnetic separation method is a method of extracting a biological substance by applying a magnetic field using magnetic beads having a function of carrying the biological substance which is an extraction target.

Among biological substance test methods, a polymerase chain reaction (PCR) method is a method of extracting a nucleic acid (DNA, RNA, or the like) and specifically amplifying and detecting the nucleic acid. In order to efficiently extract a nucleic acid which is the test target, in the recent PCR method, the magnetic separation method using magnetic beads having a function of carrying the nucleic acid is used. Specifically, magnetic beads, which have a function of carrying a test target substance on surfaces of the magnetic beads, are loaded into a dispersion liquid, the dispersion liquid is loaded in a magnetic field generator such as a magnetic stand, and ON/OFF of magnetic field application is repeated a plurality of times to extract the target substance such as a nucleic acid. Since such a magnetic separation method is a method of separating and recovering beads by a magnetic force, a rapid separation operation can be performed.

In addition, the same magnetic separation method is used not only in the extraction performed in the PCR method but also in fields of protein purification, exosome, cell separation and extraction, or the like.

Various studies have been made for the magnetic beads used in the magnetic separation method employed in the test and extraction of such a biological substance.

For example, JP-A-2017-176023 describes magnetic beads which have an average particle diameter from 0.5 μm to 10 μm and which is obtained by coating an amorphous magnetic powder with a silicon oxide film.

Along with an increasing demand for the recent PCR tests or the like, in diagnosis and various tests in the medical field, improvement of an extraction efficiency of the test target substance and improvement of the test accuracy are required.

However, the magnetic beads described in JP-A-2017-176023 have the following problems.

A sufficient extraction amount of a biological substance which is a test target cannot be secured, which leads to a decrease in the extraction efficiency.

In some cases, reliability in test cannot be secured due to mixing of impurities (contamination) or the like.

In an acidic solution used in a step of extracting RNA (ribonucleic acid) or the like, metal ions such as iron ions are eluted from the magnetic beads, and the sufficient extraction amount may not be obtained.

These problems will be described in more detail below.

A series of steps of extracting a test target substance such as a nucleic acid includes a dissolution and extraction step, a magnetic separation step, a washing step, and an elution step, and for example, in order to increase the adsorption efficiency of the target substance on the surfaces of the magnetic beads in the dissolution and extraction step, or in order to increase the washing efficiency in the washing step, stirring of magnetic beads dispersion liquid is performed using a vortex mixer or the like in the middle of the step. During the stirring, the magnetic beads collide with each other, or the magnetic beads collide with a wall surface of a container in which the dispersion liquid is stored. Due to impact of these collisions, deformation of the magnetic beads themselves or destruction and desorption of the silicon oxide films on the surfaces of the magnetic beads occurs. In addition, in the magnetic separation step, when the magnetic beads move in a magnetic field, the magnetic beads collide with each other, and in such a case, the deformation of the magnetic beads, the destruction and desorption of the silicon oxide films, or the like also occur.

When the deformation of the magnetic beads or the destruction and desorption of the silicon oxide films occurs, a test target substance such as a nucleic acid adsorbed to the silicon oxide films provided on the surfaces of the magnetic beads is not adsorbed, and extraction of a sufficient amount of the test target substance is difficult, which leads to a decrease in the extraction efficiency.

In addition, when the silicon oxide films formed on the surfaces are destructed and peeled off, the destructed magnetic bead pieces and the peeled silicon oxide films themselves become impurities (contamination), and as a result, the test accuracy is lowered.

Further, in the acidic solution used in the step of extracting RNA or the like, the silicon oxide films on the surfaces of the magnetic beads are destructed and peeled off, thus a magnetic metal powder as a base material is exposed, and elution of iron ions or the like in the acidic solution occurs. The adsorption of the extraction target substance to the magnetic beads is performed through a chaotropic reaction described later, but when such iron ions or the like are eluted into the solution, ion balance in the solution is unstable, and as a result, an extraction amount of the target substance such as RNA decreases.

SUMMARY

In order to solve the above problem, magnetic beads according to an application example of the present disclosure is magnetic beads including a magnetic metal powder and a coating layer covering a surface of the magnetic metal powder, in which D50, which is a 50% particle diameter on a volume basis in a particle size distribution of the magnetic beads, is from 0.5 μm to 50 μm, a ratio of an average thickness (t) of the coating layer to the D50 of the magnetic beads in the particle size distribution, that is, t/D50, is from 0.0001 to 0.05, and a Vickers hardness of the magnetic metal powder is 100 or more.

According to the magnetic beads of the present disclosure, when a biological substance which is a test target such as a nucleic acid is extracted from a specimen, deformation of the magnetic beads and breakage of the coating layer due to collision between the magnetic beads can be prevented. As a result, sufficient extraction efficiency of the biological substance which is the test target can be secured, and high test accuracy can be achieved.

Magnetic beads dispersion liquid according to an application example of the present disclosure is magnetic beads dispersion liquid containing 30% by weight to 80% by weight of the above magnetic beads in which the D50 is from 0.5 μm to 50 μm and the t/D50 is from 0.0001 to 0.05; and a dispersion medium being a remainder, that is an aqueous solution or an organic solvent.

According to the magnetic beads dispersion liquid of the present disclosure, the magnetic beads can be uniformly dispersed in the liquid, and a biological substance which is a test target can be sufficiently adsorbed on surfaces of the magnetic beads. As a result, the extraction efficiency of the biological substance can be secured and a high test accuracy can be achieved.

A method of manufacturing magnetic beads according to an application example of the present disclosure includes: a magnetic metal powder manufacturing step of obtaining a magnetic metal powder; a coating step of forming a coating layer on the magnetic metal powder; a classifying step of classifying the magnetic metal powder or the magnetic metal powder on which the coating layer is formed, the classifying step being performed before or after the coating step; and a heat treatment step of performing a heat treatment on the magnetic metal powder on which the coating layer is formed, the heat treatment step being performed after the coating step. In the classifying step, the classification is performed such that D50, which is a 50% particle diameter on a volume basis in a particle size distribution of the magnetic beads, is from 0.5 μm to 50 μm. In the coating step, the coating layer is formed such that a ratio of an average thickness (t) of the coating layer to the D50, that is, t/D50, is from 0.0001 to 0.05. In the heat treatment step, the heat treatment is performed such that a Vickers hardness of the magnetic metal powder including the coating layer is 100 or more.

According to the method of manufacturing the magnetic beads of the present disclosure, it is possible to obtain the magnetic beads, in which the coating layer having an improved adsorption ability for a biological substance which is a test target is formed on the magnetic metal powder having a predetermined hardness. As a result, the extraction efficiency of the biological substance can be secured and the high test accuracy can be achieved.

A method of manufacturing magnetic beads dispersion liquid according to an application example of the present disclosure includes: manufacturing magnetic beads by manufacturing a magnetic metal powder and forming a coating layer on the magnetic metal powder such that D50, which is a 50% particle diameter on a volume basis in a particle size distribution, is from 0.5 μm to 50 μm, a ratio of an average thickness (t) of the coating layer to the D50, that is, t/D50, is from 0.0001 to 0.05, and a Vickers hardness of the magnetic metal powder is 100 or more; and mixing and dispersing the magnetic beads in a dispersion medium composed of an aqueous solution or an organic solvent.

DESCRIPTION OF EXEMPLARY EMBODIMENTS

Hereinafter, a magnetic bead and a method of manufacturing the same according to an embodiment of the present disclosure will be described.

1. Magnetic Bead

Figure 1:
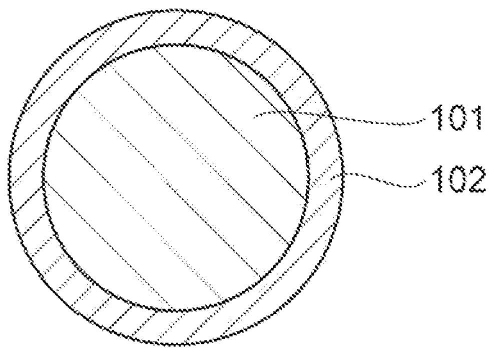
FIG. 1 is a schematic diagram showing a structure of a magnetic bead according to an embodiment.

The magnetic bead in the present disclosure is used in the process of extracting a biological substance, that is, a nucleic acid such as DNA and RNA, a cell, a bacterium, a virus, or the like utilizing a separation process using magnetism, and is a magnetic bead which is a particle group capable of adsorbing the biological substance and has a powder form. As shown in FIG. 1, a particle structure of the magnetic bead includes a "magnetic metal powder 101" that is a core, and a "coating layer 102" that covers a surface of the magnetic metal powder 101. The magnetic beads in the present disclosure refer to an aggregate of these particles.

In the magnetic beads, D50, which is a 50% particle diameter (median diameter) on a volume basis in a particle size distribution of the magnetic beads, is preferably in a range from 0.5 μm to 50 μm. The D50 is more preferably from 2 μm to 20 μm. When the D50 is less than 0.5 μm, a value of the magnetization per particle of the magnetic bead is small, and the aggregation of the beads is remarkable. As a result, an extraction efficiency of the biological substance decreases. Therefore, the D50 of the magnetic beads is 0.5 μm or more. Accordingly, by setting the D50 of the magnetic beads to 0.5 μm or more, it is possible to perform extraction and recovery operations of a test target substance using a magnetic field at high speed. For the same reason, the D50 is more preferably 2 μm or more, and the extraction efficiency can be increased.

On the other hand, when the D50 of the magnetic beads exceeds 50 μm and is coarse, since a specific surface area is small, the biological substance (nucleic acid, protein, or the like) which is the test target cannot be sufficiently carried on the surface. As a result, there is a problem that an extraction amount is reduced. In addition, the magnetic beads settle at an early stage of the test, and as a result, the number of the magnetic beads contributing to the extraction of the test target substance is reduced, which also causes the extraction efficiency to decrease. Therefore, the D50 of the magnetic beads is preferably 50 μm or less, and more preferably 20 μm or less.

In addition, in the magnetic beads of the present disclosure, a ratio of an average thickness (t) of a coating layer to the D50 of the magnetic beads in the particle size distribution, that is, t/D50, is preferably from 0.0001 to 0.05. When the t/D50 is less than 0.0001, a ratio of the thickness of the coating layer to a size of the magnetic metal powder is too small. When the magnetic beads collide with each other or the magnetic beads collide with a wall surface of a container, the coating layer is destructed or peeled off. Therefore, an extraction amount of biomolecules, which are test targets adsorbed and extracted to the surface of the coating layer, cannot be sufficiently obtained, and the extraction efficiency decreases. In addition, pieces of the peeled coating layer and magnetic metal powder are present in a dispersion liquid, and are mixed as impurities (contamination) when the biological substance which is the extraction target is taken out, which causes the test accuracy to decrease. Further, the coating layer is destructed and peeled off, thus the magnetic metal powder as a base material is exposed, and elution of iron ions or the like occurs in an acidic solution or the like. As a result, the extraction efficiency decreases.

On the other hand, when the t/D50 exceeds 0.05, a volume ratio of the coating layer to the entire volume of the magnetic bead increases, and the magnetization per volume of the magnetic bead decreases. Such a decrease in magnetization results in a decrease in a moving speed of the magnetic bead in the magnetic field in a magnetic separation step, which increases a time required for a test step, and leads to a decrease in a test efficiency.

In addition, a Vickers hardness of the magnetic metal powder constituting the magnetic bead of the present disclosure is preferably 100 or more. When the Vickers hardness is less than 100, the magnetic metal powder is plastically deformed due to an impact when the magnetic beads collide with each other. When plastic deformation occurs, the coating layer has a deformability smaller than the magnetic metal powder. As a result, peeling or falling of the coating layer occurs, which leads to a decrease in the extraction efficiency of the biological substance and a decrease in the test accuracy similar to those described above. For the same reason, the Vickers hardness is more preferably 300 or more, and still more preferably 800 or more. On the other hand, an upper limit of the Vickers hardness is not particularly limited, and may be 3000 or less from the viewpoint of ease of selection of materials suitable for balance between a performance and cost.

In addition, in the magnetic beads of the present disclosure, a value of D90/D50, which is a ratio of D90 (90% particle diameter on a volume basis) to the D50, is preferably 3.00 or less. When the D90/D50 is larger than 3.00, a particle size distribution in which a large amount of coarse particles are present is obtained. Since coarse magnetic bead particles have high magnetism in a magnetic field, when a large amount of coarse magnetic bead particles are mixed, the coarse magnetic bead particles aggregate while attracting relatively small particles around the coarse magnetic bead particles, and even when the magnetic field is turned off, a dispersibility is impaired and significant aggregation is caused. Further, when the magnetic bead particles aggregate with each other, the magnetic bead particles settle on a bottom portion of a dispersion liquid due to the own weight of the magnetic bead particles, which may lead to a decrease in the extraction efficiency and an increase in the test time. Therefore, the D90/D50 is set to 3.00 or less, more preferably 2.00 or less, and still more preferably 1.75 or less.

The D50 and the D90 of the magnetic beads can be obtained by, for example, measuring a particle size distribution on the volume basis by a laser diffraction and dispersion method and obtaining a cumulative distribution curve from the particle size distribution. Specifically, in the cumulative distribution curve, a particle diameter at a cumulative value of 50% from a small diameter side is the D50 (median diameter), and a particle diameter at a cumulative value of 90% from the small diameter side is the 90% particle diameter D90. Examples of a device for measuring the particle diameter by the laser diffraction and dispersion method include MT3300 series manufactured by MicrotracBEL Corporation. The measurement can be performed not only by the laser diffraction and dispersion method but also by a method such as image analysis.

A shape of the magnetic bead in the embodiment is not particularly limited, and may be a circular, elliptical, or polygonal cross-sectional shape. From the viewpoint of preventing the aggregation of the magnetic beads and improving a mobility, a proportion of bead particles having a circularity of 0.60 or less in the magnetic beads is preferably 3% or less. When particles having a circularity of 0.60 or less are present in an amount of more than 3%, in the magnetized particles, due to a shape magnetic anisotropy, a density of magnetic field lines formed by the particles is not uniform. As a result, the aggregation of the magnetic beads is remarkable. Further, since such aggregation occurs, the mobility of the magnetic beads decreases.

The circularity is defined by the following formula.

$$\text{Circularity}=4\pi S/L^2 \text{(* denominator is square of } L)$$

Here, S represents a projected area of a particle, and L represents a circumferential length of a particle.

The circularity of the magnetic bead particle can be measured by image processing. An area and a circumferential length of each powder particle can be calculated by performing the image processing using an image including a plurality of powder particles captured by a scanning microscope (SEM), an optical microscope, or the like. Further, an abundance ratio of powder particles each having a specific circularity among the plurality of powder particles can also be calculated. Specifically, for example, the projected area, the circumferential length, and the abundance ratio can be measured by using Image-J, which is a free image processing system developed by National Institutes of Health.

The magnetic beads have a function of carrying a biological substance which is an extraction target on the surfaces of the magnetic beads. Therefore, the extraction amount and the extraction efficiency of the biological substance greatly depend on the specific surface area of the magnetic beads. The larger the specific surface area, the larger the amount of the biological substance which is the extraction target and can be carried on the surfaces of the magnetic beads, and the extraction efficiency is improved. As a result, it is possible to improve the efficiency and speed of the test. The specific surface area of the magnetic beads is measured by a so-called BET method, and the specific surface area can be measured by a method described in "JISK1150: silica gel test method" or the like. The specific surface area of the magnetic beads is preferably in a range from 0.05 $m^2/g$ to 40 $m^2/g$. When the specific surface area is less than 0.05 $m^2/g$, the amount of the test target substance that can be extracted is reduced, and the test efficiency is greatly reduced. On the other hand, when the specific surface area is more than 30 $m^2/g$, impurities other than the target substance to be extracted are easily carried, which leads to a decrease in the test accuracy. Further, for this reason, the specific surface area is more preferably in a range from 0.1 $m^2/g$ to 30 $m^2/g$.

Saturation magnetization of the magnetic beads in the embodiment is preferably 50 emu/g or more, and more preferably 100 emu/g or more. The "saturation magnetization" is a value of magnetization exhibited by a magnetic material when a sufficiently large magnetic field is applied from the outside. The larger the saturation magnetization of the magnetic beads, the more sufficiently the function as the magnetic material can be exhibited. Specifically, since a moving speed (recovery speed) after extraction in the magnetic field can be improved, a test time can be shortened. In order to obtain such an effect, the saturation magnetization of the magnetic beads is preferably 50 emu/g or more, and more preferably 100 emu/g or more. An upper limit of the saturation magnetization of the magnetic beads is not particularly limited, and may be 220 emu/g or less from the viewpoint of the ease of selection of the materials suitable for the balance between the performance and the cost.

The saturation magnetization of the magnetic beads can be measured by a vibrating sample magnetometer (VSM) or the like. As the vibrating sample magnetometer, for example, "TM-VSM1230-MHHL" manufactured by Tamakawa Co., Ltd., or the like can be used for the measurement. A maximum applied magnetic field during the measurement of the saturation magnetization is measured by applying a magnetic field of, for example, 0.5 T or more.

In addition, a coercive force Hc of the magnetic beads is preferably 1500 A/m or less. The "coercive force Hc" refers to a value of an external magnetic field in an opposite direction required to return a magnetized magnetic body to an unmagnetized state. That is, the coercive force Hc means a resistance to the external magnetic field. As the coercive force Hc of the magnetic beads reduces, the magnetic beads are less likely to aggregate even when the magnetic field application is switched from the state in which the magnetic field is applied to the state in which the magnetic field is not applied, and the magnetic beads can be uniformly dispersed in the dispersion liquid. Further, even when the switching of the magnetic field application is repeated, the smaller the coercive force Hc is, the more excellent the redispersibility of the magnetic beads is, and therefore, the aggregation of the magnetic beads can be further prevented. In order to obtain such an effect, the coercive force Hc of the magnetic beads is preferably 1500 A/m or less, and more preferably 800 A/m or less. A lower limit of the coercive force Hc of the magnetic metal powder is not particularly limited, and may be 5 A/m or more from the viewpoint of the ease of selection of the materials suitable for the balance between the performance and the cost.

The coercive force Hc of the magnetic beads and a relative permeability described below can be measured by the vibrating sample magnetometer in the same manner as the saturation magnetization.

The relative permeability of the magnetic beads in the embodiment is desirably 5 or more. The upper limit is preferably as high as possible, and is not particularly limited. Since the magnetic beads are in the form of powder, the relative permeability often takes a value of substantially 100 or less due to an influence of a diamagnetic field. When the relative permeability is less than 5, the moving speed of the magnetic beads associated with the application of the magnetic field decreases, which hinders high-speed processing.

As described above, the magnetic bead in the embodiment has a form in which the magnetic metal powder is used as the core and the coating layer is provided on the magnetic metal powder. Therefore, constituent elements and a composition of the magnetic bead are measured as constituent elements of the magnetic metal powder and the coating layer, which will be described later, and a composition as an abundance ratio of the constituent elements. The measurement of the constituent elements and the composition can be specified by, for example, an ICP emission spectrometry defined in JIS G 1258:2014, a spark emission spectrometry defined in JIS G 1253:2002, or the like. Examples of an analyzer include a solid emission spectrometer (spark emission spectrometer, model: SPECTROLAB, type: LAVMB08A) manufactured by SPECTRO Analytical Instruments GmbH. and an ICP device (CIROS120 type) manufactured by Rigaku Corporation. In quantitative determination of a content of C or S, in particular, oxygen gas flow combustion (high-frequency induction furnace combustion), that is, an infrared absorption method defined in JIS G 1211:2018 can be applied. Examples of a carbon content analyzer include a carbon-sulfur analyzer (CS200 type) manufactured by LECO Corporation.

1.1 Magnetic Metal Powder

As shown in FIG. 1, the magnetic bead of the embodiment includes the magnetic metal powder 101 as the core thereof. The magnetic metal powder is magnetic particles, and preferably contains at least one of Fe, Co, and Ni as the constituent elements. In particular, from the viewpoint of obtaining of a high saturation magnetization, in the composition of the magnetic metal powder, it is preferable to increase a content of Fe, and it is more preferable to use a composition containing Fe as a main component. Specifically, an atomic ratio of Fe is more preferably 50% or more, and still more preferably 70% or more. The magnetic metal powder may be pure Fe composed only of Fe. In addition, the composition of the magnetic metal powder may be an alloy containing Fe as a main component (Fe-based alloy), and examples thereof include a Fe—Co-based alloy, a Fe—Ni-based alloy, a Fe—Co—Ni-based alloy, and a compound containing Fe, Co, and Ni.

The Fe-based alloy can contain one element or two or more elements selected from the group consisting of Cr, Nb, Cu, Al, Mn, Mo, Si, Sn, B, C, P, Ti, and Zr depending on intended characteristics, in addition to elements exhibiting ferromagnetism alone such as Co and Ni as described above. From the viewpoint of obtaining of high magnetization, a carbonyl iron powder, a Fe—Si-based alloy powder, a Fe—Si—Cr-based alloy powder, or the like containing substantially 100% by mass of Fe is preferable as the magnetic metal powder. Si is a main constituent element in the alloy powder, amorphization is promoted, and the Fe-based alloy may contain inevitable impurities as long as the effects of the present disclosure are not impaired.

The inevitable elements in the embodiment are elements (impurities) that are unintentionally mixed during manufacturing of a material of the magnetic metal powder or the magnetic bead. The inevitable elements are not particularly limited, and examples thereof include O, N, S, Na, Mg, and K.

The constituent elements and the composition of the magnetic metal powder can be specified by the ICP emission spectrometry defined in JIS G 1258:2014, the spark emission spectrometry defined in JIS G 1253:2002, or the like, similarly to that of the magnetic bead described above. The constituent elements and the composition of the magnetic metal powder can be measured by the above methods for both the magnetic metal powder in a state before the coating layer is formed, and the magnetic powder in a state in which the coating layer is removed from the magnetic bead by a chemical or physical method. In addition, when it is difficult to remove the coating layer from the magnetic bead, it is possible to, for example, cut a bead cross section and analyze a portion of the magnetic metal powder that is the core by an analyzer such as EPMA or EDX. In this case, the measurement can also be performed by embedding the magnetic metal powder in a resin and analyzing a cut surface.

As described above, the Vickers hardness of the magnetic metal powder is preferably 100 or more. A method of measuring a hardness of the magnetic metal powder is, for example, as follows. That is, a plurality of magnetic beads are taken out and embedded in the resin to form a so-called "resin-embedded sample", and then the cross section of the magnetic metal powder is caused to appear on a surface of the resin-embedded sample by grinding and polishing. The cross section of the magnetic metal powder is subjected to indentation using a micro Vickers tester, a nanoindenter, or the like, and the hardness is measured based on a size of the indentation.

A metal structure constituting the magnetic metal powder can take various forms such as a crystal structure, an amorphous structure, and a nanocrystal structure. Here, the amorphous structure refers to an amorphous structure in which no crystal is present. The nanocrystal refers to a structure in which a fine crystal having a crystal particle diameter of about 100 nm is present. Among these, the amorphous structure or the nanocrystal structure is particularly preferable in the embodiment. That is, a high hardness is easily obtained by forming the magnetic metal powder in the amorphous structure or the nanocrystal structure. In addition, when the amorphous structure or the nanocrystal structure is used, the coercive force Hc is a low value, and the effect of contributing to the improvement of the dispersibility of the magnetic beads is also obtained as described above. The metal structure of the magnetic metal powder can be any structure when the crystal structure, the amorphous structure, and the nanocrystal structure described above is present alone or when any one of these structures is present in a mixed manner.

The metal structure of the magnetic metal powder can be identified by an X-ray diffraction method with respect to the magnetic metal powder before the magnetic beads or the coating layer is formed. Further, the metal structure can be specified by analyzing a tissue observation image or a diffraction pattern of the cut-out sample by a TEM. More specifically, in the case of the amorphous structure, for example, a diffraction peak derived from a metal crystal such as an αFe phase is not observed in peak analysis in the X-ray diffraction method. In addition, a so-called halo pattern is formed in an electron beam diffraction pattern obtained by the TEM, and formation of a spot by a crystal is not observed. The nanocrystal structure is composed of a crystal structure having a particle diameter of about 100 nm or less, and can be confirmed from a TEM observation image. More precisely, an average particle diameter can be calculated by image processing or the like based on a plurality of TEM structure observation images in which a plurality of crystals are present. In addition, the crystal particle diameter can be estimated by a Sheler method based on the diffraction peak of the crystal phase to be analyzed by the X-ray diffraction method. Further, for a crystal structure having a large particle diameter, the crystal particle diameter or the like can be observed and measured by a method such as observing a cross section using an optical microscope or SEM.

In order to obtain the amorphous structure and the nanocrystal structure, it is effective to increase a rapid cooling rate during solidification in the manufacturing of the magnetic metal powder. In addition, ease of formation of the amorphous structure and the nanocrystal structure also depends on the alloy composition.

As a specific alloy suitable for forming the amorphous structure or the nanocrystal structure, a composition containing Fe and one or two or more selected from the group consisting of Cr, Si, B, C, P, Nb, and Cu is preferable.

For the nanocrystal structure or the crystal structure, in the embodiment of the present disclosure, a magnetic phase mainly containing Fe (for example, the αFe phase) is formed, and the crystal particle diameter is preferably from 1 nm to 3 μm.

A powder particle diameter, a particle size distribution, and a circularity of the magnetic metal powder may be selected such that the magnetic beads have the various characteristics described above when the coating layer is applied to the surface of the magnetic metal powder to form the magnetic bead. In addition, similarly, magnetic characteristics may be selected such that the magnetic characteristics of the final magnetic beads are the characteristics and the ranges described above.

Similarly, the specific surface area of the magnetic metal powder may be selected such that the specific surface area of the magnetic beads has the above-described value when the coating layer is applied to form the magnetic bead.

1.2. Coating Layer

The coating layer is formed on the surface of the magnetic metal powder as shown in FIG. 1, and constitutes the magnetic bead. The coating layer can exhibit a function as long as the coating layer is formed on at least a part of the surface of the magnetic metal powder, and is preferably formed so as to cover the entire surface.

A main function of the coating layer is to capture the biological substance which is the extraction target on the surface of the coating layer. From this viewpoint, the coating layer preferably has the following substances or chemical structures on the surface.

A first preferred substance constituting the coating layer is an oxide film of a silicon oxide or the like.

The silicon oxide is a substance particularly suitable for extraction of a nucleic acid such as DNA and a RNA, and preferably has a composition formula, for example, $SiO_x$ ($0<x\leq 2$), and specifically, $SiO_2$ is preferable. The silicon oxide enables extraction and recovery of the nucleic acid by specifically adsorbing the nucleic acid in an aqueous solution containing a chaotropic substance. The "chaotropic substance" is a substance that has a function of increasing a water solubility of hydrophobic molecules and contributes to nucleic acid adsorption. Specific examples of the chaotropic substance include guanidine hydrochloride, sodium iodide, and sodium perchlorate. In addition, the coating layer may contain silicon oxide and an oxide of one selected from the group consisting of Al, Ti, V, Nb, Cr, Mn, Sn, and Zr or contain a composite oxide or a composite of silicon and oxides of two or more selected from the above group. Al, Ti, V, Nb, Cr, Mn, Sn, and Zr are elements that prevent ion elution from the magnetic metal powder which is a coated target and are excellent in a so-called elution resistance. Therefore, by using an oxide, a composite oxide, or a composite of these elements as the coating layer, it is possible to improve an extraction performance of the test target substance while securing the elution resistance. In addition, a plurality of layers of oxides of different elements or the like may be formed in the coating layer.

A second preferred substance constituting the coating layer is a substance having a functional group, which increases a bonding property with the biological substance which is the extraction target, on the surface of the coating layer. Examples of the functional group that increases the bonding property include an OH group, a COOH group, an $NH_2$ group, an epoxy group, a trimethylsilyl group, and an NHS group, depending on the target substance.

Examples of other preferable substances constituting the coating layer include proteins such as streptavidin, Protein A, and Protein B, and carbon. In addition, when a nucleic acid is an extraction target, examples of the preferable substances also include a nucleic acid having a property complementary to the nucleic acid which is the target, specifically, an oligo (dT) primer cDNA, or the like.

As described above, a main function of the coating layer is to capture the biological substance which is the extraction target, but it is desirable that the coating layer does not capture substances such as impurities that are not the extraction target. When there is a concern that impurities or the like may be mixed, it is preferable to dispose, on the surface of the coating layer, a substance called a so-called blocking substance and the above-described substance that promotes the capture, although the blocking substance may be unnecessary depending on a state of a specimen before the extraction or the biological substance which is the extraction target. Examples of the blocking substance include polyethylene glycol, albumin, and dextrin.

The coating layer may contain inevitable impurities as long as the effects of the present disclosure are not impaired. For example, when the silicon oxide is used as the coating layer, the inevitable impurities in the silicon oxide include C, N, P, or the like.

The substance and the composition constituting the coating layer can be confirmed by, for example, EDX analysis, an Auger electron spectroscopy measurement, or the like. For example, a configuration of the coating layer can be confirmed by measuring a composition distribution in a radial direction of the particle by the EDX analysis on the formed coating layer.

In a depth direction of the magnetic bead, the structure of the coating layer may be any structure including a single layer made of a single substance, a single layer made of a plurality of substances, composites (such as composite oxides), or a mixture, and a plurality of layers made of these substances. In addition, the surface of the coating layer may be made of either the single substance or the plurality of substances.

An average thickness (t) of the coating layer is preferably from 1 nm to 100 nm regardless of the above-described structure. When the average thickness of the coating layer is less than 1 nm, portions that cannot be coated on the surface of the magnetic metal powder are generated, and a carried amount of the extraction target substance is reduced. On the other hand, when the average thickness of the coating layer exceeds 100 nm, the extraction performance of the test target substance is saturated, and a film formation time is significantly increased. Further, the average thickness is more preferably from 3 nm to 50 nm for the same reason.

The thickness of the coating layer can be measured based on a cross-sectional observation image of the magnetic bead by a transmission electron microscope (TEM), a scanning electron microscope (SEM), or the like, and an average value of the thickness can be calculated by obtaining a plurality of the observation images and averaging measured values in image processing or the like. In the embodiment, the thickness of the coating layer is measured for 10 or more particles, and the average value thereof is obtained. In addition, the thickness of the coating layer of the particle is measured at five or more positions for one particle, and the average value thereof is obtained.

In addition, in ESCA or the like, the thickness of the coating layer can also be measured by performing composition analysis in the depth direction using ion etching.

Further, depending on the substance constituting the coating layer, it is also possible to measure the thickness of the coating layer by using a so-called calibration curve obtained as a result of comparing a characteristic X-ray intensity ratio of the constituent substance obtained by a scanning electron microscope (SEM-EDX) or a diffraction peak intensity ratio of the constituent substance obtained by the X-ray diffraction method with an actual measurement value obtained by another observation method. For example, when the coating layer made of the silicon oxide is formed on the surface of the magnetic metal powder mainly containing Fe, the thickness can be calculated based on an intensity ratio of diffraction peaks generated due to the magnetic metal powder and the silicon oxide.

2. Magnetic Beads Dispersion Liquid

In a step of extracting a target substance, the magnetic beads are used in a state of being dispersed in a dispersion medium composed of an aqueous solution, an organic solvent, or the like. A liquid in which the magnetic beads are dispersed in the dispersion medium is used as the magnetic bead dispersion liquid in the embodiment of the present disclosure.

Examples of the dispersion medium include water, saline, polar organic solvents such as alcohols, and aqueous solutions thereof.

Examples of the water include sterilized water and pure water. Examples of the alcohols include ethanol and isopropyl alcohol.

A concentration of the magnetic beads in the magnetic bead dispersion liquid is 30% by weight to 80% by weight. When the concentration is less than 30% by weight, a concentration of the biological substance (such as the nucleic acid) which is a target in a dissolution and adsorption step cannot be sufficiently obtained, which hinders the test. On the other hand, when the concentration exceeds 80% by weight, the amount of the dispersion medium is too small, and it is difficult to secure uniformity.

In addition, a surfactant may be added for the purpose of improving the dispersibility of the magnetic beads in the dispersion liquid. Examples of the surfactant include a nonionic surfactant, a cationic surfactant, an anionic surfactant, and an amphoteric surfactant.

Examples of the nonionic surfactant include a triton-based surfactant such as Triton (registered trademark)-X and a tween-based surfactant such as Tween (registered trademark) 20, and acylsorbitan. Examples of the cationic surfactant include dodecyltrimethylammonium bromide, dodecyltrimethylammonium chloride, and cetyltrimethylammonium bromide. Examples of the anionic surfactant include sodium lauryl sulfate also referred to as sodium dodecyl sulfate (SDS), sodium N-lauroyl sarcosine, sodium glycolate, and sarcosine. Examples of the amphoteric surfactant include phosphatidylethanolamine. These surfactants may be used alone or in combination of two or more thereof.

A content of the surfactant in a magnetic bead reagent is preferably equal to or larger than a critical micelle concentration of the surfactant. The critical micelle concentration is also referred to as cmc, and refers to a concentration at which molecules of the surfactant dispersed in the liquid aggregate to form a micelle. When the content of the surfactant is equal to or larger than the critical micelle concentration, the surfactant easily forms a layer around the magnetic beads. Accordingly, effects of preventing the aggregation of the magnetic beads can be further improved.

The content of the surfactant is not limited to being equal to or larger than the critical micelle concentration, and may be less than the critical micelle concentration. For example, the content of the surfactant in the magnetic bead reagent is preferably 0.05% by mass or more and 3.0% by mass or less regardless of the critical micelle concentration.

Further, in order to ensure a long-term preservability and preservative effects, it is preferable to add a preservative to the dispersion liquid. Examples of the preservative include sodium azide. A concentration of the added preservative is preferably 0.02% by weight or more and less than 0.1% by weight. When the concentration is less than 0.02% by weight, the long-term preservability and the sufficient preservative effects cannot be obtained, and when the concentration is 0.1% or more, problems such as a decrease in the extraction efficiency of the biological substance occur.

In addition, a buffer solution for pH adjustment may be added. Examples of the buffer solution include a tris-buffer.

3. Method of Manufacturing Magnetic Bead

Next, a method of manufacturing the magnetic bead in the embodiment of the present disclosure will be described.

A method of manufacturing the magnetic bead includes a magnetic metal powder manufacturing step of manufacturing a magnetic metal powder, a classifying step of classifying the magnetic metal powder so as to have a predetermined particle diameter and a predetermined particle diameter distribution, and a step of forming a coating layer on the magnetic metal powder subjected to the classifying step. Hereinafter, the manufacturing method in each of the steps will be described.

3.1. Method of Manufacturing Magnetic Metal Powder

The method of manufacturing the magnetic metal powder is based on a method of manufacturing a general metal powder, and roughly includes any one of a melting process for melting and solidifying a metal to form a powder, a chemical process for manufacturing a powder by a reduction method, a carbonyl method, or the like, and a mechanical process for mechanically pulverizing a larger shape such as an ingot to obtain a powder. Among them, the magnetic metal powder in the embodiment of the present disclosure is most suitable for manufacturing by the melting process.

In the manufacturing method based on the melting process, an atomizing (spraying) method is exemplified as a representative manufacturing method. In this method, molten metal having a desired composition and formed by melting is sprayed onto a powder.

In the melting step, first, a predetermined amount of a starting material is weighed such that the composition of the magnetic metal powder is a desired composition. The starting material is not particularly limited, and for example, pure Fe is used as the material of Fe, metal silicon or a ferrosilicon alloy is used as the material of Si, and a ferrochrome alloy is used as the material of Cr. The weighed materials are heated to a temperature equal to or higher than a melting point in a high-frequency induction melting furnace or the like and melted to obtain a molten metal.

The atomization method is a method in which the molten metal obtained in this manner is rapidly cooled and solidified by colliding with a fluid (liquid or gas) injected at a high speed, and the molten metal is pulverized. The atomization method is classified into a water atomization method, a high-pressure water atomization method, a high-speed rotating water atomization method, a gas atomization method, or the like depending on a type of a cooling medium and a configuration of a device. By manufacturing the metal powder by such an atomization method, the magnetic metal powder can be efficiently manufactured. Further, in the high-pressure water atomization method, the high-speed rotating water atomization method, and the gas atomization method, a particle shape of the metal powder is close to a spherical shape due to an action of surface tension. Among them, in the high-pressure water atomization method or the high-speed rotating water atomization method, fine molten metal droplets are formed, and thereafter, the molten metal droplets are rapidly cooled and solidified by a high-speed water stream, so that a rapidly cooled powder close to a spherical shape and having a fine particle diameter can be obtained. In these manufacturing methods, the molten metal can be cooled at an extremely high cooling rate of about $10^{3\circ}$ C./sec to $10^{6\circ}$ C./sec, and therefore, solidification can be achieved with a high degree of disordered atomic arrangement maintained in the molten metal. Therefore, a powder having an amorphous structure can be efficiently manufactured. In addition, by appropriately performing a heat treatment on the obtained amorphous powder, a powder having a nanocrystal structure having a crystal particle diameter of about 100 nm or less can also be obtained.

As a result, the magnetic metal powder having such an amorphous structure or nanocrystal structure is a powder having a small coercive force Hc, and as described above, the magnetic beads having the excellent dispersibility can be obtained.

As a method of obtaining the magnetic metal powder by the chemical process, the carbonyl method is typical, and in particular, it is known as a manufacturing method of obtaining a spherical powder of pure Fe or pure Ni. In particular, the pure Fe powder obtained by the carbonyl method has high saturation magnetization and has a high moving speed in the magnetic field as described above, which contributes to a high speed and high efficiency of the extraction step. However, in some cases, the particles produced by the carbonyl method may not obtain a sufficient Vickers hardness, and the desired effects as described in the present disclosure may not be obtained.

After the magnetic metal powder manufacturing step, the classifying step or a coating step is performed. That is, in the embodiment, regardless of an order of the classifying step and the coating step, after the magnetic metal powder manufacturing step, the coating step may be performed after the classifying step is performed, or conversely, the classifying step may be performed after the coating step is performed.

Therefore, a classification method and a coating method will be described below in this order, and the classifying step is not necessarily performed prior to the coating step.

3.2. Classification Method

The magnetic metal powder or the magnetic beads subjected to the coating step are classified such that a particle diameter and a particle diameter distribution of the finally obtained magnetic beads have desired values or ranges. However, the classification is not necessarily an essential step, and the classification may not be performed when the magnetic beads having the desired particle diameter and particle size distribution are finally obtained without performing the classification.

As the classification method, a method using a sieve, a method using a difference in moving distance due to a centrifugal force in a fluid such as air or water, a method using a difference in settling velocity using the gravity in the same fluid (gravity classification), or the like can be can be applied.

Classification in a fluid is generally classified into dry classification (wind classification) in which a classification method is performed in a gas such as air, and wet classification in which classification is performed in a liquid such as water.

Classification based on a so-called cyclone method, a rotor method, or the like using the difference in moving distance due to the centrifugal force is used in any of the dry classification and the wet classification, and can be applied in any case in the embodiment of the present disclosure. The classification in the liquid is more preferable from the viewpoint of improving the dispersibility of the metal powder or the beads in the fluid and preventing the aggregation of the particles. Examples of a dry classification device include Aerofine Fine Classifier and Turbo Fine Classifier manufactured by Nisshin Engineering Inc, and examples of a wet classification device include a slurery screner manufactured by Eurotec Co., Ltd.

When gravity classification is performed in the embodiment of the present disclosure, it is difficult to perform the gravity classification in a gas, and it is preferable to perform the gravity classification in a liquid. In the gravity classification, while it takes time to perform classification, more precise classification can be performed due to a difference in settling time. For example, a powder or beads having a sharp particle diameter distribution with the D90/D50 of 2 or less can be obtained, and classification can be accurately performed with a minute size having the D50 of several μm or less. As the device, for example, an upright cylindrical wet classifier or the like can be used, and the desired particle diameter and particle diameter distribution can be obtained by obtaining a settling velocity for each particle size (particle diameter) in advance and collecting a powder or beads from the classifier according to the settling time. In addition, prior to the gravity classification, the dispersion liquid in which the powder or the beads are dispersed may be stirred in advance by a stirring mechanism, and the powder or the beads may be uniformly dispersed in the liquid. The stirring method is not particularly limited, and a stirring mechanism having a blade shape or the like may be used, or ultrasonic waves may be applied.

When the wet classification including the gravity classification is performed, any of water, an aqueous solution, and an organic solvent-based solution can be applied as the dispersion medium. In addition, in order to improve the dispersibility of the metal powder or the beads and to prevent the aggregation of the particles during the classification, a dispersant such as a polycarboxylic acid may be used. Alternatively, a surfactant may be added for the same purpose. However, it is preferable to reduce an amount of addition to such an extent that the function of the metal powder or the beads is not hindered.

Among the wet classification, in the classification method using the difference in moving distance due to the centrifugal force, a powder or beads are charged into the aqueous-based or organic solvent-based dispersion medium described above, and the dispersion medium is charged into a classifier in a so-called slurry state. In this case, the concentration of the powder or beads in the dispersion medium is not particularly limited, and is preferably 5% by weight to 30% by weight. In an actual classifying step, desired classification is performed by adjusting, as device conditions, a flow rate of a dispersed slurry supplied to a classifying device per unit time and a pressure during charging of the dispersed slurry. In addition, in a method using a rotor, classification is performed while adjusting a rotor rotation speed.

3.3. Coating Layer Forming Method

The magnetic bead is obtained by forming the coating layer on the surface of the magnetic metal powder. Here, a method of forming the coating layer according to the embodiment of the present disclosure will be described.

The coating layer forming method is not particularly limited as long as it is a method of obtaining an average thickness of the coating layer described above and a material and structure for forming the coating layer described above. Examples of the coating layer forming method include a wet forming method such as a sol-gel method, and a dry forming method such as atomic layer deposition (ALD), chemical vapor deposition (CVD), and ion plating. In addition, a silane coupling treatment and various surface modification treatments for forming the substance such as a protein or the chemical structure described above can also be applied as these methods.

Among them, when the silicon oxide film suitable for the nucleic acid extraction is used as the coating layer, a Stober method, which is a type of the sol-gel method, or the above-described ALD method can be mainly used.

The Stober method is a method of forming monodisperse particles by hydrolyzing a metal alkoxide. When the coating layer is made of the silicon oxide, the coating layer can be formed by a hydrolysis reaction of a silicon alkoxide.

Specifically, first, the magnetic metal powder is dispersed in an alcohol solution containing the silicon alkoxide. Examples of the alcohol solution include lower alcohols such as ethanol and methanol. As a ratio of the silicon alkoxide to the alcohol, for example, 10 parts by weight to 50 parts by weight of the alcohol may be mixed with 1 part by weight of tetraethoxysilane. In addition, as a ratio of the magnetic metal powder to the silicon alkoxide, 0.01 part by weight to 0.1 part by weight of the silicon alkoxide may be mixed with 1 part by weight of the magnetic metal powder in order to provide a uniform coating film on the particle surface. In addition, examples of the silicon alkoxide include tetramethoxysilane (TMOS), tetraisopropoxysilane, tetrapropoxysilane, tetrakis(trimethylsilyloxy)silane, tetrabutoxysilane, tetraphenoxysilane, and tetrakis(2-ethylhexyloxy)silane. As the silicon alkoxide, tetraethoxysilane (TEOS, $Si(OC_2H_5)_4$) or the like is preferably used.

Next, as a catalyst for promoting a reaction, ammonia water is supplied to cause hydrolysis. Accordingly, a dehydration condensation reaction occurs between hydrolyzates or between the hydrolyzates and the silicon alkoxide, and a bond of —Si—O—Si— is formed on the surface of the particles, and therefore, a silicon oxide film is formed.

Before and after the ammonia water is supplied, the magnetic metal powder and the alcohol solution are preferably stirred using an ultrasonic wave applying device or the like. Accordingly, by performing the stirring in each step, it is possible to promote uniform dispersion of the particles and to form the silicon oxide film uniformly on the surface of the particles. The stirring is preferably performed for a period of time longer than a period of time during which the hydrolysis reaction of the silicon alkoxide sufficiently proceeds.

In addition, in the above description, an order, in which the magnetic metal powder is dispersed in the alcohol solution containing the silicon alkoxide and then the ammonia water is supplied, is set, and the present disclosure is not limited to this order. For example, an order may be set in which the alcohol solution containing the silicon alkoxide may be mixed after the ammonia water is mixed with the alcohol solution in which the magnetic metal powder is dispersed. In such a case, the alcohol solution containing the silicon alkoxide may be added several times. When the alcohol solution containing the silicon alkoxide is added several times, the above-described stirring may be performed every time the alcohol solution is added, or the alcohol solution may be added to the solution under stirring.

As a material having the same effect as that of the ammonia water, triethylamine, triethanolamine, or the like may be used.

In addition, the thickness of the coating layer is affected by a ratio of silicon alkoxide in the solution. That is, when the ratio of the silicon alkoxide in the solution is increased, the thickness of the coating layer is increased. When the ratio is excessively increased, the excessive silicon oxide may be formed alone. Therefore, the ratio of the silicon alkoxide in the solution is adjusted such that a desired thickness of the coating layer is obtained.

The magnetic beads of the embodiment can be manufactured by the above steps, and the heat treatment may be applied to the obtained magnetic beads in order to further improve the performance. For example, by drying and firing the magnetic beads at 60° C. to 300° C. for 10 minutes to 300 minutes, a hydrate remaining in the beads can be removed and a strength of the beads can be improved.

The ALD method is also a method suitable for forming a coating film of the silicon oxide. In a specific silicon oxide film forming method based on the ALD method, the magnetic metal powder is charged into a chamber in which vacuum evacuation and atmosphere control can be performed, and at the same time, a substance, which is called a precursor for forming the silicon oxide film, specifically, dimethylamine, methylethylamine, diethylamine, trisdimethylaminosilane, bisdiethylaminosilane, bis-tertiary-butylaminosilane, or the like is charged into the chamber, and then thermally decomposed to form the silicon oxide on the surface of the magnetic metal powder. According to the ALD method, since the coating layer can be formed by deposition at an atomic layer level, the ALD method is suitable for forming a dense film.

In addition, by selecting the precursor, it is possible to form an oxide layer other than the silicon oxide or a coating layer made of a composite oxide.

4. Method of Manufacturing Magnetic Beads Dispersion Liquid

The magnetic beads dispersion liquid can be manufactured by adjusting components of additives such as magnetic beads, a dispersion medium, and a surfactant so as to have the configuration described above. The component adjustment is not particularly limited as long as it is performed in a mixing and dispersing step which is widely performed in general. Depending on the biological substance which is the extraction target, it is necessary to devise to prevent contamination of foreign matters that causes a decrease in detection efficiency. For example, in a dispersion liquid in which RNA is an extraction target, a DEPC treatment is performed for the purpose of preventing contamination of RNase. In addition, in other cases, from the viewpoint of preventing contamination of impurities and foreign matters, it is also preferable that the dispersion liquid is manufactured in an environment in which a certain degree of cleanness is maintained, or the dispersion liquid is sterilized as necessary.

5. Extraction Process of Biological Substance

An extraction process of a biological substance obtained by the magnetic separation method using the magnetic beads dispersion liquid will be described. Here, as described above, the biological substance refers to nucleic acids such as DNA (deoxyribonucleic acid) and an RNA, various cells such as proteins and cancer cells, and substances such as peptides and viruses. The nucleic acid may be present in a state of being contained in, for example, a biological sample such as a cell or biological tissue, a virus, or a bacterium.

Figure 2:
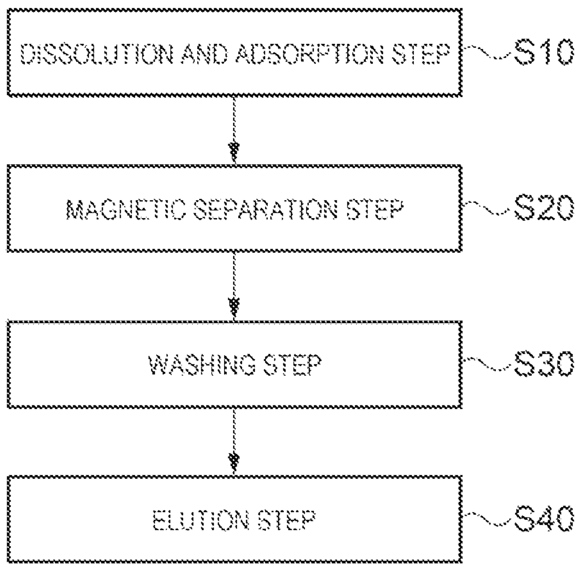
FIG. 2 is a schematic diagram of a biological substance extraction process according to the embodiment.

An outline of the extraction process of the biological substance obtained by the magnetic separation method is as shown in FIG. 2, and the biological substance which is an extraction target is extracted through steps including mixing, separation, washing, and elution, which will be described in detail later. A procedure of the extraction process is usually determined for each dispersion liquid or each target biological substance, and is usually clearly indicated by a provider. Such a procedure is generally referred to as an "extraction protocol".

Hereinafter, each step of the extraction process will be described by taking a case where DNA is an extraction target as an example.

5.1. Dissolution and Adsorption Step

In a dissolution and adsorption step S10, a specimen sample (cells, blood, or the like) containing DNA is placed in a container, and the magnetic beads dispersion liquid and a dissolution and adsorption liquid are mixed in the container. Since DNA is usually encapsulated in a cell membrane or a nucleus, first, the DNA is extracted by dissolving and removing the cell membrane or a so-called outer shell of the nucleus by a dissolution action in the dissolution and adsorption liquid, and the DNA is adsorbed to the magnetic beads by an adsorption action of the dissolution and adsorption liquid.

Here, as the dissolution and adsorption liquid, for example, a liquid containing a chaotropic substance is used. The chaotropic substance generates chaotropic ions in an aqueous solution, reduces an interaction of water molecules, thereby destabilizing the structure, and contributes to the adsorption of nucleic acids to the magnetic beads. Examples of the chaotropic substance present as the chaotropic ions in the solution include guanidine thiocyanate, guanidine hydrochloride, sodium iodide, potassium iodide, and sodium perchlorate. Among these, guanidine thiocyanate or guanidine hydrochloride having a strong protein modification effect is preferably used.

A concentration of the chaotropic substance in the dissolution and adsorption liquid varies depending on the chaotropic substance, and is preferably, for example, 1.0 M or more and 8.0 M or less. In particular, when guanidine thiocyanate is used, the concentration thereof is preferably 3.0 M or more and 5.5 M or less. Further, in particular, when guanidine hydrochloride is used, the concentration thereof is preferably 4.0 M or more and 7.5 M or less.

The dissolution and adsorption liquid may contain a surfactant. The surfactant is used to destroy a cell membrane or cause denaturation of a protein contained in a cell. The surfactant is not particularly limited, and examples thereof include nonionic surfactants such as polyoxyethylene sorbitan monolaurate, triton-based surfactants, and tween-based surfactants, and anionic surfactants such as sodium N-lauroyl sarcosine. Among these, the nonionic surfactant is particularly preferable. Accordingly, when the nucleic acid after extraction is analyzed, an influence of an ionic surfactant is prevented. As a result, it is possible to perform analysis by an electrophoresis method and broaden options for analysis methods.

A concentration of the surfactant in the dissolution and adsorption liquid is not particularly limited, and is preferably 0.1% by mass or more and 2.0% by mass or less.

In addition, the dissolution and adsorption liquid may contain at least one of a reducing agent and a chelating agent. Examples of the reducing agent include 2-mercaptoethanol and dithiothreitol. Examples of the chelating agent include disodium dihydrogen ethylenediaminetetraacetic acid dihydrate (EDTA).

A concentration of the reducing agent in the dissolution and adsorption liquid is not particularly limited and is preferably 0.2 M or less. A concentration of the chelating agent in the dissolution and adsorption liquid is not particularly limited and is preferably 0.2 mM or less.

A pH of the dissolution and adsorption liquid is not particularly limited and is preferably neutral with a pH of 6 or more and a pH of 8 or less. In addition, in order to adjust the pH, tris(hydroxy)aminomethane, HCl, or the like may be added as a buffer solution.

In the dissolution and adsorption step S10, contents contained in the container are stirred by a vortex mixer, hand shaking, or the like as necessary. A stirring time is not particularly limited, and may be 5 seconds or more and 40 minutes or less.

5.2. Separation Step (B/F Separation) Based on Magnetic Separation Method

In a magnetic separation step S20, an external magnetic field is applied on the magnetic beads to which DNA is adsorbed, and the magnetic beads are magnetically attracted. Accordingly, the magnetic beads are moved to and fixed to a wall surface of the container. As a result, the magnetic beads in a solid phase can be separated from a liquid phase.

The magnetic separation step S20 is performed after the dissolution and adsorption step S10, a washing step S30, or the like in the entire extraction process as necessary.

As described above, since the magnetic beads in the embodiment have high saturation magnetization, the magnetic beads are rapidly moved due to a magnetic field, and are effective in shortening a time of the step. Specifically, in order to apply the external magnetic field to the magnetic beads according to the present disclosure, a time from the installation of the container in a magnetic stand to the end of the movement can be 15 seconds or less, and further 5 seconds or less. In addition, since the coercive force Hc is in a sufficiently small range, the aggregation of the beads caused by a residual magnetization hardly occurs when the external magnetic field is removed, uniform dispersion can be performed, and further, remaining of the liquid between the aggregated beads can be reduced to increase the extraction efficiency.

In the magnetic separation step S20, prior to the magnetic separation, the contents contained in the container are stirred by the vortex mixer, the hand shaking, or the like as necessary. Accordingly, a probability that the nucleic acids are adsorbed to the magnetic beads increases.

After the magnetic beads are fixed, an acceleration may be applied to the container as necessary. Accordingly, the liquid attached to the magnetic beads can be shaken off, so that the solid phase and the liquid phase can be separated from each other more accurately. The acceleration may be a centrifugal acceleration. In order to apply the centrifugal acceleration, a centrifugal separator may be used.

After the magnetic beads and the liquid phase are separated from each other as described above, the liquid phase in the container is discharged by a pipette or the like in a state in which the magnetic beads are fixed to the wall surface of the container.

5.2.1. Magnetic Stand

In the magnetic separation step S20, a magnetic field generator that generates the external magnetic field is used. A configuration or the like of the magnetic field generator are not particularly limited, and unlike a relatively large-scale device such as an electromagnet, a magnetic stand can be used as one of devices that generate a magnetic field in a compact form and efficiently perform the magnetic separation step S20.

Figure 3:
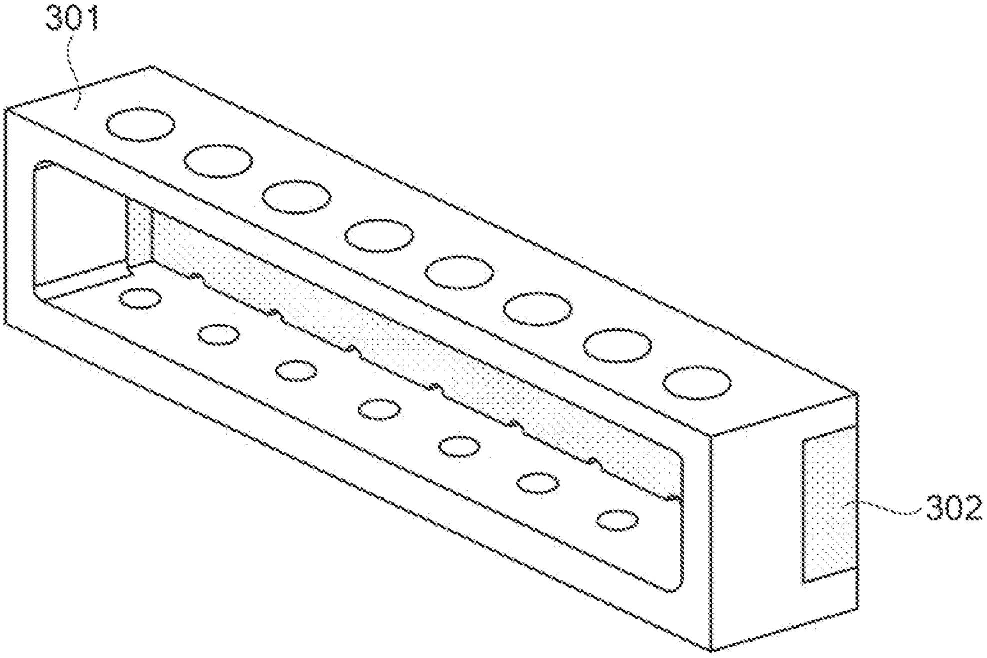
FIG. 3 is a schematic diagram of a magnetic stand according to the embodiment.

FIG. 3 is a schematic view of an example of the magnetic stand. The magnetic stand is configured such that a magnet plate 302 having a plurality of permanent magnet pieces as a magnetic field generation source is disposed on a stand 301 made of a non-magnetic material. In the magnetic separation step S20, a structure is set in which a container containing the magnetic beads dispersion liquid and various reagents is disposed in the stand 301, and the magnetic beads are attracted and separated by a magnetic field generated by the plurality of permanent magnet pieces disposed on the magnet plate 302 adjacent to the stand 301.

As the permanent magnet used in the embodiment, a neodymium iron boron magnet, a samarium-cobalt magnet, a ferrite magnet, an alnico magnet, or the like can be used. A neodymium iron boron sintered magnet is preferably used for being able to generate a sufficient magnetic field by a smaller magnet piece. The neodymium iron boron magnet is preferably used by being coated such as nickel plating, from the viewpoint of securing reliability over time such as a corrosion resistance.

Surface magnetic fluxes generated from the permanent magnet pieces preferably has a magnetic flux density of 50 mT or more, more preferably 200 mT or more. As a method of measuring the surface magnetic fluxes, for example, the surface magnetic fluxes can be measured by a Gauss meter using a Hall element.

A material of the magnetic stand body is not particularly limited as long as the magnetic stand body is non-magnetic as described above. For example, a plastic such as ABS, polypropylene, or nylon, or a metal such as an aluminum alloy is used.

Sizes of the magnetic stand and the permanent magnet pieces are selected according to a size or the like of the container disposed in the magnetic stand. For example, as a container used in a nucleic acid extraction process of DNA or the like, a container called a so-called microtube is generally used, and a container having a capacity of, for example, about 1.5 ml is generally used. On the other hand, in a protein extraction process, a so-called liquid biopsy extraction process, or the like, a container having a larger capacity may be used, and a large magnetic stand and a large permanent magnet piece are applied to such applications.

In the magnetic stand of FIG. 3, a plate-shaped permanent magnet piece is used, and a container is disposed on a side surface of the permanent magnet piece, and a shape of the permanent magnet piece, a positional relationship between the container and the magnet, or the like are not limited to the aspect of this drawing. For example, a case where a container may be disposed at a center of an annular magnet, a magnet may be disposed on a bottom surface side of the container instead of a side surface of the container, or the like can be selected depending on an application.

5.3. Washing Step

After the liquid phase other than the magnetic beads is removed in the magnetic separation step S20, the washing step S30 is performed. In this step, the magnetic beads to which the nucleic acids are adsorbed are washed. The washing is an operation of removing impurities by bringing the magnetic beads on which the nucleic acids are adsorbed into contact with a washing liquid and then separating the magnetic beads from the cleaning liquid again in order to remove the impurities adsorbed on the magnetic beads.

Specifically, as described in the magnetic separation step S20, in a state in which the magnetic beads are fixed in the container by the external magnetic field generated by the magnetic field generator, first, the washing liquid is supplied into the container by a pipette or the like. Then, the magnetic beads and the washing liquid are stirred. Accordingly, the washing liquid is brought into contact with the magnetic beads, and the magnetic beads on which the nucleic acids are adsorbed are washed. At this time, the external magnetic field may be temporarily removed. Accordingly, the magnetic beads are dispersed in the washing liquid, so that a washing efficiency can be further improved.

Next, the magnetic beads are fixed again in the container by the external magnetic field, and the washing liquid is discharged. By repeating supply and discharge of the washing liquid as described above once or more times, the magnetic beads can be washed, that is, impurities excluding the nucleic acids, which are the extraction target, can be removed.

The washing liquid is not particularly limited as long as it is a liquid that does not promote elution of the nucleic acids and does not promote binding of impurities to the magnetic beads. Examples of the washing liquid include organic solvents such as ethanol, isopropyl alcohol, and acetone, aqueous solutions of the organic solvents, and a low salt concentration aqueous solution. Examples of the low salt concentration aqueous solution include a buffer solution. A salt concentration in the low salt concentration aqueous solution is preferably 0.1 mM or more and 100 mM or less, and more preferably 1 mM or more and 50 mM or less. A salt for the buffer solution is not particularly limited, and a salt of such as TRIS, HEPES, PIPES, or phosphoric acid is preferably used.

The washing liquid may contain a surfactant such as Triton (registered trademark), Tween (registered trademark), or sodium dodecyl sulfate. In addition, the washing liquid may contain a chaotropic substance such as guanidine hydrochloride.

A pH of the washing liquid is not particularly limited.

In the washing step S30, in a state in which the washing liquid is brought into contact with the magnetic beads, the contents contained in the container are stirred by a vortex mixer, hand shaking, or the like as necessary. Accordingly, the washing efficiency can be improved.

The washing step S30 may be performed as necessary and may be omitted when washing is not necessary.

5.4. Elution Step

In an elution step S40, the nucleic acids in a carried state is eluted from the magnetic beads. The elution is an operation of transferring the nucleic acids to an eluate by bringing the magnetic beads on which the nucleic acids are adsorbed into contact with the eluate and then separating the magnetic beads from the eluate again.

Specifically, first, the eluate is supplied into the container by a pipette or the like. Then, the magnetic beads and the eluate are stirred. Accordingly, the eluate is brought into contact with the magnetic beads, and the nucleic acids can be eluted. At this time, the external magnetic field may be temporarily removed. Accordingly, the magnetic beads are dispersed in the eluate, so that an elution efficiency can be further improved.

Next, the magnetic beads are fixed again by the external magnetic field, and the eluate from which the nucleic acids are eluted is discharged. Accordingly, the nucleic acids can be recovered.

The eluate is not particularly limited as long as it is a liquid that promotes the elution of the nucleic acids from the magnetic beads on which the nucleic acids are adsorbed. For example, in addition to water such as sterilized water or pure water, a TE buffer solution, that is, an aqueous solution containing 10 mM Tris-HCl buffer solution and 1 mM EDTA and having a pH of 8 is preferably used.

The eluate may contain a surfactant such as Triton (registered trademark), Tween (registered trademark), or sodium dodecyl sulfate. In addition, the eluate may contain sodium azide as a preservative.

In the elution step S40, in a state in which the eluate is brought into contact with the magnetic beads on which the nucleic acids are adsorbed, the contents contained in the container are stirred by a vortex mixer, hand shaking, or the like as necessary. Accordingly, the elution efficiency can be improved.

In addition, in the elution step S40, the eluate may be heated. Accordingly, the elution of the nucleic acids can be promoted. A heating temperature for the eluate is not particularly limited, and is preferably 70° C. or higher and 200° C. or lower, more preferably 80° C. or higher and 150° C. or lower, and still more preferably 95° C. or higher and 125° C. or lower.

Examples of a heating method include a method in which an eluate heated in advance is supplied, and a method in which an unheated eluate is supplied into a container and then is heated. A heating time is not particularly limited, and may be 30 seconds or more and 10 minutes or less.

For example, the elution step S40 may be performed as necessary, and for example, when only the separation of the magnetic beads from the liquid phase in the magnetic separation step S20 is the purpose, the elution step S40 may be omitted.

EXAMPLES

Hereinafter, the present disclosure will be described in more detail with reference to Examples, and the present disclosure is not limited to these Examples.

Examples 1 to 5 and Comparative Examples 1 and 2

A magnetic metal powder having an alloy composition of $Fe_{73}Si_{11}Cr_2B_{11}C_3$ (A composition formula is represented by atom %. The following is the same) was produced by a high-pressure water atomization method. In the production, a plurality of magnetic metal powders having different particle size distributions were obtained by changing manufacture conditions and classification conditions during atomization. In addition, metal structure analysis of each of the obtained powders was performed by an X-ray diffraction method, and it was confirmed that a main structure was an amorphous structure or a crystal structure.

Thereafter, a film of silicon oxide ($SiO_2$) was formed on a surface of each magnetic metal powder by a Stober method to obtain magnetic beads. In the Stober method, first, 100 g of a sample of each magnetic metal powder was dispersed and mixed in 950 mL of ethanol, and the mixed solution was stirred for 20 minutes by an ultrasonic wave applying device. After stirring, a mixed solution of 30 mL of pure water and 180 mL of ammonia water was added, and the mixture was further stirred for 10 minutes.

Thereafter, a mixed solution of tetraethoxysilane (hereinafter referred to as TEOS) and 100 mL of ethanol was further added and stirred, and a silicon oxide film having various film thicknesses was formed on the surface of the magnetic metal powder by adjusting an addition amount of TEOS and a stirring time, thereby producing the magnetic beads. Further, the obtained magnetic beads were washed with ethanol and acetone. After the washing, the magnetic beads were dried at 65° C. for 30 minutes, and further fired at 200° C. for 90 minutes.

For each of the obtained magnetic beads, a particle size distribution was measured by a laser diffraction method, a silicon oxide film thickness (t) was measured by cross-sectional observation, a Vickers hardness was measured by a micro Vickers tester, and saturation magnetization and a coercive force were measured by a vibrating sample magnetometer (VSM). The results obtained by structure analysis and various measurements for each magnetic beads are shown in Table 1.

TABLE 1

| Used magnetic bead | Alloy composition (atomic %) of magnetic metal powder | Main metal structure | D50 (μm) | Silicon oxide film thickness t (nm) | t/D50 | Vickers hardness of magnetic metal powder | Saturation magnetization (emu/g) | Coercive force (A/m) |
|---|---|---|---|---|---|---|---|---|
| Example 1 | $Fe_{73}Si_{11}Cr_2B11C_3$ | Amorphous | 1 | 45 | 0.045 | 950 | 87 | 28 |
| Example 2 | $Fe_{73}Si_{11}Cr_2B11C_3$ | Amorphous | 3 | 33 | 0.011 | 900 | 108 | 36 |
| Example 3 | $Fe_{73}Si_{11}Cr_2B11C_3$ | Amorphous | 5 | 25 | 0.005 | 900 | 112 | 33 |
| Example 4 | $Fe_{73}Si_{11}Cr_2B11C_3$ | Amorphous | 10 | 31 | 0.0031 | 830 | 113 | 48 |
| Example 5 | $Fe_{73}Si_{11}Cr_2B11C_3$ | Amorphous | 45 | 48 | 0.0011 | 810 | 114 | 89 |
| Comparative Example 1 | $Fe_{73}Si_{11}Cr_2B11C_3$ | Amorphous | 0.4 | 52 | 0.13 | 970 | 49 | 72 |
| Comparative Example 2 | $Fe_{73}Si_{11}Cr_2B11C_3$ | Crystal | 55 | 5 | 0.00009 | 430 | 115 | 230 |

Each of the magnetic beads shown in Table 1 was dispersed in pure water in an amount of 50% by weight to obtain a magnetic beads dispersion liquid. By using each of the magnetic beads dispersion liquids, DNA was extracted using Hela cells as a specimen based on an extraction process of a biological substance described in the embodiment for carrying out the disclosure described above. In the extraction process, first, in the dissolution and adsorption step S10, an aqueous solution containing guanidine hydrochloride was used as a dissolution and adsorption liquid, and stirring was performed for 10 minutes by a vortex mixer. Thereafter, separation (B/F separation) by a magnetic separation method was performed using the magnetic stand shown in FIG. 3, and DNA was extracted into an eluate through the washing step S30 and the elution step S40. In the elution step S40, stirring was also performed for 10 minutes by a vortex mixer. Hereinafter, the eluate from which DNA was extracted is referred to as a "DNA extract liquid".

The DNA extract liquid obtained from each magnetic beads was subjected to a real-time PCR measurement. The real-time PCR measurement is a method of detecting a target substance (here, DNA) present in a specimen by a polymerase chain reaction, and a Ct (cycle threshold) value used for evaluation of a result represents a numerical value indicating how many times amplification is performed until the target substance reaches a detectable threshold. More specifically, the Ct value is the number of cycles when an amplification product reaches a certain amount and a fluorescence luminance reaches a certain value or more in the PCR measurement. That is, as the Ct value decreases, the extraction efficiency of the test target substance increases, and a test time can be shortened. Therefore, as an amount of the DNA in the DNA extract liquid increases, the number of times of amplification for reaching the threshold decreases, and the Ct value is also decreased to a small value. On the other hand, when the amount of DNA is very small, even when the amplification is performed, the target substance cannot reach the detectable threshold. Therefore, in Examples, when the threshold is not reached even when the number of times of amplification is set to 60 times or more, the Ct value is undetectable (denoted as "ND" in the table).

The results obtained by measuring Ct values of the DNA extract liquids obtained using the magnetic beads shown in Table 1 are shown in Table 2. From Table 2, it can be seen that a low Ct value is obtained in Examples of the present disclosure, and DNA can be efficiently recovered. On the other hand, in Comparative Examples, it can be seen that the Ct value is undetectable (ND), and DNA sufficient for detection is not obtained.

TABLE 2

| Used magnetic bead | Ct value | Peeling of silica oxide film | Absorbance | Magnetic separation time (s) |
|---|---|---|---|---|
| Example 1 | 43 | No | Good | 12.1 |
| Example 2 | 25 | No | Good | 8.6 |
| Example 3 | 29 | No | Good | 7.9 |
| Example 4 | 35 | No | Good | 7.2 |
| Example 5 | 56 | No | Good | 6.7 |
| Comparative Example 1 | ND | No | Good | 385 |
| Comparative Example 2 | ND | Yes | Poor | 6.5 |

The magnetic beads were taken out from the same DNA extract liquid, and the magnetic beads were subjected to morphological observation and local composition analysis using a scanning electron microscope (SEM-EDX). From the results, the results obtained by determining whether the silicon oxide film is peeled off and fall off are also shown in Table 2. In Examples of the present disclosure, peeling and falling of the silicon oxide film were not observed, and as a result, it was seen that the Ct value can be reduced, that is, DNA recovery efficiency can be improved.

Similarly, each of the magnetic beads shown in Table 1 was dispersed in pure water in an amount of 50% by weight to obtain magnetic beads dispersion liquid. Each of these magnetic beads dispersion liquids was subjected to a DNA extraction process using Hela cells as a specimen, and stirring was performed for 10 minutes using a vortex mixer after the dissolution and adsorption step S10. Thereafter, when the magnetic beads were accumulated by a magnetic field in the magnetic separation step S20, a supernatant liquid was collected and an absorbance measurement was performed to measure a generation state of impurities (contamination) in the liquid. More specifically, a value obtained by subtracting an absorbance of light having a wavelength of 260 nm from an absorbance of light having a wavelength of 340 nm was measured for each supernatant liquid using a photometer (nanodrop) manufactured by Thermo Fisher Scientific K.K. When this value exceeds 0.05, impurities are a factor of inhibiting the test and sufficient test accuracy cannot be obtained, and therefore, when the measurement value is less than 0.05, the absorbance is indicated by "Good", and when the measurement value is 0.05 or more, the absorbance is indicated by "Poor". The results are also shown in Table 2.

Similarly, each of the magnetic beads shown in Table 1 was dispersed in pure water in an amount of 50% by weight to obtain magnetic beads dispersion liquid. The magnetic beads dispersion liquid was subjected to a DNA extraction process using Hela cells as a specimen, and in the magnetic separation step S20 in the extraction process, a magnetic separation time was measured. The magnetic separation time is an indication of a time from when the magnetic beads dispersion liquid is set in a magnetic stand in which a magnetic field is generated to when the magnetic beads are accumulated in the vicinity of a magnet by the magnetic field. Specifically, a transmission type absorbance meter was used in a state in which the magnetic beads dispersion liquid was set in the magnetic stand, a measurement was performed by using a phenomenon, in which the magnetic beads were accumulated in the magnet and a substantially transparent portion in the liquid was increased to decrease the absorbance, and a time during which the absorbance decreased by 90% is defined as the "magnetic separation time". The measurement results of the magnetic separation time are also shown in Table 2.

From the above results, in the magnetic beads and the magnetic beads dispersion liquids according to Examples of the present disclosure, the improvement of the nucleic acid recovery efficiency, the improvement of the test accuracy due to a decrease in impurities, and the shortening of the magnetic separation time were all possible. On the other hand, in Comparative Example 1, the t/D50 is too large, the magnetization per volume of the magnetic beads is small, the DNA recovery efficiency deteriorates, and the magnetic separation time increases. In addition, in Comparative Example 2, the t/D50 is too small, peeling of the silicon oxide film occurs, and it is difficult to carry the DNA on the bead surface. Therefore, the DNA recovery efficiency deteriorates, and the test accuracy due to contamination of impurities is reduced.

Examples 6 to 10 and Comparative Examples 3 and 4

A magnetic metal powder having an alloy composition of $Fe_{88}Si_5Cr_7$ was produced by a high-pressure water atomization method. In the production, a plurality of magnetic metal powders having different particle size distributions were obtained by changing manufacture conditions and classification conditions during atomization. Thereafter, silicon oxide films having various film thicknesses were formed on surfaces of the magnetic metal powders by adjusting film formation conditions in a Stober method, and magnetic beads shown in Table 3 were obtained. Various analyses and measurements were performed in the same manner as described above.

Each of the magnetic beads shown in Table 3 was dispersed in an aqueous solution, which contains pure water and hydrochloric acid, in an amount of 55% by weight to obtain magnetic beads dispersion liquid. The magnetic beads dispersion liquid has a pH of 2.6, which is substantially the same as that of an acidic dissolution and adsorption liquid used in the dissolution and adsorption step S10 when RNA is extracted. Each of these magnetic beads dispersion liquids was stirred by a vortex mixer for 20 minutes, and then an elution amount of Fe ions ($Fe^{2+}$) in the solution was measured. The elution amount was determined by adding a color reaction solution to each liquid, and then measuring an absorbance, and based on the elution amount obtained in advance and a value of a calibration curve of the absorbance. Fe ions are eluted from the magnetic metal powder constituting the magnetic beads, but when the Fe ions are eluted into the liquid, a chaotropic reaction is inhibited in an RNA extraction step, and the carry of the RNA on the surfaces of the magnetic beads is inhibited. From this viewpoint, more specifically, the elution amount of Fe ions is preferably less than 1 ppm. A case where the Fe ion elution amount was less than 1 ppm was evaluated as Good, and a case where the Fe ion elution amount was 1 ppm or more was evaluated as Poor, and the results are shown in Table 4. In Examples of the present disclosure, the elution amount of Fe ions was as small as less than 1 ppm.

Each of the magnetic beads shown in Table 3 was dispersed in pure water in an amount of 55% by weight to obtain magnetic beads dispersion liquid. RNA was extracted from Hela cells as a specimen, and the RNA was finally extracted into each eluate. Hereinafter, the eluate from which the RNA is extracted is referred to as an "RNA extract liquid". In the extraction process, an acidic solution having a pH of 2.6 was used as the dissolution and extraction liquid in the dissolution and adsorption step S10. In addition, in each of the dissolution and adsorption step S10 and the elution step S40, stirring was performed by a vortex mixer for 10 minutes. The RNA extract liquid obtained from each magnetic beads was subjected to a PCR test to measure a Ct value. The measurement results are also shown in Table 4.

TABLE 4

| Used magnetic bead | Fe ion elution amount <1 ppm | Ct value |
|---|---|---|
| Example 6 | Good | 43 |
| Example 7 | Good | 38 |
| Example 8 | Good | 39 |
| Example 9 | Good | 36 |
| Example 10 | Good | 25 |
| Comparative Example 3 | Poor | ND |

TABLE 3

| Used magnetic bead | Alloy composition (atomic %) of magnetic metal powder | Main metal structure | D50 (μm) | Silicon oxide film thickness t (nm) | t/D50 | Vickers hardness of magnetic metal powder | Saturation magnetization (emu/g) | Coercive force (A/m) |
|---|---|---|---|---|---|---|---|---|
| Example 6 | $Fe_{88}Si_5Cr_7$ | Crystal | 2 | 11 | 0.0055 | 410 | 187 | 930 |
| Example 7 | $Fe_{88}Si_5Cr_7$ | Crystal | 4 | 29 | 0.0073 | 395 | 184 | 857 |
| Example 8 | $Fe_{88}Si_5Cr_7$ | Crystal | 7 | 51 | 0.0073 | 389 | 185 | 820 |
| Example 9 | $Fe_{88}Si_5Cr_7$ | Crystal | 12 | 43 | 0.0036 | 368 | 189 | 815 |
| Example 10 | $Fe_{88}Si_5Cr_7$ | Crystal | 20 | 32 | 0.0016 | 341 | 191 | 831 |
| Comparative Example 3 | $Fe_{88}Si_5Cr_7$ | Crystal | 8 | 0.5 | 0.00006 | 382 | 193 | 773 |
| Comparative Example 4 | $Fe_{88}Si_5Cr_7$ | Crystal | 20 | 1.5 | 0.00008 | 337 | 193 | 812 |

TABLE 4-continued

| Used magnetic bead | Fe ion elution amount <1 ppm | Ct value |
|---|---|---|
| Comparative Example 4 | Poor | ND |

From the above results, in the magnetic beads and the magnetic beads dispersion liquids according to Examples of the present disclosure, the elution of Fe ions can be prevented even in a step of immersion in the acidic solution, such as the RNA extraction step. As a result, a low Ct value can be obtained, and high RNA recovery efficiency can be obtained.

Examples 11 to 20 and Comparative Examples 5 to 7

Magnetic metal powders having various alloy compositions were produced by a high-pressure water atomization method. In the production, a plurality of magnetic metal powders having different particle size distributions were obtained by changing manufacture conditions during atomization. On the other hand, in Comparative Examples 6 and 7, a pure iron powder produced by a carbonyl method, instead of an atomization method, was used as the magnetic metal powder. Thereafter, silicon oxide films having various film thicknesses were formed on surfaces of the magnetic metal powders by the same manufacturing method as that of Examples 1 to 5, and magnetic beads shown in Table 4 were obtained. Various analyses and measurements were performed in the same manner as described above.

TABLE 5

| Used magnetic bead | Alloy composition (atomic %) of magnetic metal powder | Main metal structure | D50 (um) | Silicon oxide film thickness t (nm) | t/D50 | Vickers hardness of magnetic metal powder | Saturation magnetization (emu/g) | Coercive force (A/m) |
|---|---|---|---|---|---|---|---|---|
| Example 11 | $Fe_{81}Si_5B_{12}C_2$ | Amorphous | 2 | 21 | 0.0105 | 950 | 156 | 103 |
| Example 12 | $Fe_{74}Si_{17}Al_{10}$ | Crystal | 3 | 53 | 0.0177 | 900 | 99 | 159 |
| Example 13 | $Fe_{73}Si_{10}B_{15}C_2$ | Amorphous | 5 | 49 | 0.0098 | 900 | 151 | 28 |
| Example 14 | $Fe_{93}Si_7$ | Crystal | 10 | 38 | 0.0038 | 830 | 200 | 812 |
| Example 15 | $Fe_{50}Ni_{50}$ | Crystal | 45 | 48 | 0.0011 | 1210 | 154 | 1015 |
| Example 16 | $Fe_{73.5}Si_{13.5}CU_1B_9Nb_3$ | Amorphous | 2 | 23 | 0.0015 | 950 | 121 | 38 |
| Example 17 | $Fe_{73.5}Si_{13}.5Cu_1B_9Nb_3$ | Amorphous | 3 | 50 | 0.0167 | 900 | 117 | 43 |
| Example 18 | $Fe_{73.5}Si_{13.5}Cu_1B_9Nb_3$ | Amorphous | 5 | 54 | 0.0108 | 900 | 119 | 51 |
| Example 19 | $Fe_{73}Si_{10}B_{15}C_2$ | Amorphous | 10 | 42 | 0.0042 | 830 | 143 | 28 |
| Example 20 | $Fe_{73}Si_{10}B_{15}C_2$ | Amorphous | 45 | 51 | 0.0011 | 810 | 148 | 35 |
| Comparative Example 5 | $Fe_{93}Si_7$ | Crystal | 10 | 0.8 | 0.00008 | 970 | 205 | 842 |
| Comparative Example 6 | $Fe_{100}$ (pure iron) | Crystal | 3 | 20 | 0.0067 | 83 | 198 | 484 |
| Comparative Example 7 | $Fe_{100}$ (pure iron) | Crystal | 45 | 3 | 0.00007 | 86 | 203 | 469 |

Each of the magnetic beads shown in Table 5 was dispersed in pure water in an amount of 50% by weight to obtain magnetic beads dispersion liquid. By using each of the magnetic beads dispersion liquids, a DNA was extracted using human blood as a specimen in the same process as in Examples 1 to 5 to obtain a DNA extract liquid. In the extraction process, in each of the dissolution and adsorption step S10 and the elution step S40, stirring was performed by a vortex mixer for 10 minutes.

The DNA extract liquid obtained from each of the magnetic beads was subjected to a PCR test to obtain a Ct value. The measurement results of the Ct value are shown in Table 6. In Examples of the present disclosure, it can be seen that a low Ct value is obtained, and the DNA can be extracted efficiently.

The magnetic beads were taken out from the DNA extract liquid, form observation was performed by an SEM in the same manner as in Examples 1 to 5. The results of determining the presence or absence of peeling and falling of the silicon oxide film are also shown in Table 5.

In addition, each of the magnetic beads shown in Table 5 was dispersed in pure water in an amount of 50% by weight to obtain magnetic beads dispersion liquid. The magnetic beads dispersion liquid was subjected to a PCR test, and after the dissolution and adsorption step S10, stirring was performed by a vortex mixer for 10 minutes. Thereafter, when the magnetic beads were accumulated by a magnetic field in the magnetic separation step S20, a supernatant liquid was collected and an absorbance measurement was performed in the same manner as in Examples 1 to 5 to measure a generation state of impurities (contamination) in the liquid. When the measured absorbance exceeds 100, impurities are a factor of inhibiting the test, and therefore, when the absorbance is less than a threshold, the absorbance is evaluated as "Good", and when the absorbance is equal to or larger than the threshold, the absorbance is evaluated as "Poor". The results are also shown in Table 6.

TABLE 6

| Used magnetic bead | Ct value | Peeling of silica film | Absorbance |
|---|---|---|---|
| Example 11 | 19 | No | Good |
| Example 12 | 38 | No | Good |
| Example 13 | 41 | No | Good |
| Example 14 | 35 | No | Good |
| Example 15 | 48 | No | Good |
| Example 16 | 23 | No | Good |
| Example 17 | 33 | No | Good |
| Example 18 | 51 | No | Good |
| Example 19 | 63 | No | Good |
| Example 20 | 57 | No | Good |
| Comparative Example 5 | ND | Yes | Poor |

TABLE 6-continued

| Used magnetic bead | Ct value | Peeling of silica film | Absorbance |
|---|---|---|---|
| Comparative Example 6 | ND | Yes | Poor |
| Comparative Example 7 | ND | Yes | Poor |

From the above results, in the magnetic beads and the magnetic beads dispersion liquids according to Examples of the present disclosure, the increase of the recovery amount and the improvement of the recovery efficiency of the nucleic acid, and the improvement of the test accuracy due to a decrease in impurities were possible.

What is claimed is:

1. Magnetic beads comprising:

a magnetic metal powder; and a coating layer covering a surface of the magnetic metal powder, wherein D50, which is a 50% particle diameter on a volume basis in a particle size distribution of the magnetic beads, is from 0.5 μm to 50 μm, a ratio of an average thickness (t) of the coating layer to the D50, that is, t/D50, is from 0.0001 to 0.05, a ratio of D90, which is a 90% particle diameter on a volume basis in a particle size distribution of the magnetic beads, to the D50, that is, D90/D50, is 3.00 or less, and a Vickers hardness of the magnetic metal powder is 100 or more, and wherein the magnetic metal powder is a Fe-based metal alloy powder produced by an atomization method.

2. The magnetic beads according to claim 1, wherein the magnetic metal powder is made of an alloy mainly containing Fe.

3. The magnetic beads according to claim 1, wherein the magnetic metal powder has saturation magnetization of 50 emu/g or more.

4. The magnetic beads according to claim 1, wherein the coating layer is made of a silicon oxide (silica), or silicon oxide and an oxide of one selected from the group consisting of Al, Ti, V, Nb, Cr, Mn, Sn, and Zr, or a composite oxide or a composite of silicon and oxides of two or more selected from the group.

5. Magnetic beads dispersion liquid comprising:

a magnetic bead including a magnetic metal powder and a coating layer covering a surface of the magnetic metal powder; and a dispersion medium being a remainder, that is an aqueous solution or an organic solvent, wherein D50, which is a 50% particle diameter on a volume basis in a particle size distribution of the magnetic beads, is from 0.5 μm to 50 μm, a ratio of an average thickness (t) of the coating layer to the D50, that is, t/D50, is from 0.0001 to 0.05, a ratio of D90, which is a 90% particle diameter on a volume basis in a particle size distribution of the magnetic beads, to the D50, that is, D90/D50, is 3.00 or less, and a Vickers hardness of the magnetic metal powder is 100 or more.

6. A method of manufacturing magnetic beads comprising:

a magnetic metal powder manufacturing step of obtaining a magnetic metal powder;

a coating step of forming a coating layer on the magnetic metal powder;

a classifying step of classifying the magnetic metal powder or the magnetic metal powder on which the coating layer is formed, the classifying step being performed before or after the coating step; and a heat treatment step of performing a heat treatment on the magnetic metal powder on which the coating layer is formed, the heat treatment step being performed after the coating step, wherein in the classifying step, the classification is performed such that D50, which is a 50% particle diameter on a volume basis in a particle size distribution of the magnetic beads, is from 0.5 μm to 50 μm, in the coating step, the coating layer is formed such that a ratio of an average thickness (t) of the coating layer to the D50, that is, t/D50, is from 0.0001 to 0.05, and in the heat treatment step, the heat treatment is performed such that a Vickers hardness of the magnetic metal powder including the coating layer is 100 or more.

7. A method of manufacturing magnetic beads dispersion liquid comprising:

manufacturing the magnetic beads by manufacturing a magnetic metal powder and forming a coating layer on the magnetic metal powder such that D50, which is a 50% particle diameter on a volume basis in a particle size distribution, is from 0.5 μm to 50 μm, a ratio of D90, which is a 90% particle diameter on a volume basis in a particle size distribution of the magnetic beads, to the D50, that is, D90/D50, is 3.00 or less, a ratio of an average thickness (t) of the coating layer to the D50, that is, t/D50, is from 0.0001 to 0.05, and a Vickers hardness of the magnetic metal powder is 100 or more; and mixing and dispersing the magnetic beads in a dispersion medium composed of an aqueous solution or an organic solvent.

* * * * *